(12) United States Patent
Cappuccini

(10) Patent No.: US 8,833,425 B2
(45) Date of Patent: Sep. 16, 2014

(54) MACHINE FOR REGENERATION OF PNEUMATIC TYRES

(76) Inventor: Leonardo Cappuccini, Rovereto (IT)

(*) Notice: Subject to any disclaimer, the term of this patent is extended or adjusted under 35 U.S.C. 154(b) by 304 days.

(21) Appl. No.: 13/146,258

(22) PCT Filed: Jan. 20, 2010

(86) PCT No.: PCT/EP2010/050601
§ 371 (c)(1),
(2), (4) Date: Jul. 26, 2011

(87) PCT Pub. No.: WO2010/086260
PCT Pub. Date: Aug. 5, 2010

(65) Prior Publication Data
US 2011/0277942 A1  Nov. 17, 2011

(30) Foreign Application Priority Data
Jan. 27, 2009 (IT) .............................. MI2009A0087

(51) Int. Cl.
*B29D 30/54* (2006.01)
*B23D 71/02* (2006.01)
*B24B 5/36* (2006.01)

(52) U.S. Cl.
CPC ................ *B24B 5/366* (2013.01); *B29D 30/54* (2013.01); *B23D 71/025* (2013.01); *B29D 2030/541* (2013.01)
USPC ........................................................... 157/13

(58) Field of Classification Search
USPC ................. 157/13, 14, 20; 451/550, 528, 920
See application file for complete search history.

(56) References Cited

U.S. PATENT DOCUMENTS

| | | | | |
|---|---|---|---|---|
| 2,786,526 A * | 3/1957 | Tobey | ............................... | 157/13 |
| 3,098,282 A * | 7/1963 | Robertson | ................... | 407/29.12 |
| 3,574,973 A * | 4/1971 | Rader | ............................... | 157/13 |
| 4,287,648 A * | 9/1981 | Hineborg et al. | ................ | 157/13 |
| 5,243,790 A * | 9/1993 | Gagne | ............................ | 451/528 |
| 5,259,242 A * | 11/1993 | Folta | ............................... | 157/13 |
| 7,040,371 B2 * | 5/2006 | Mory et al. | ..................... | 157/13 |

FOREIGN PATENT DOCUMENTS

EP            1 825 952        8/2007

* cited by examiner

*Primary Examiner* — Hadi Shakeri
(74) *Attorney, Agent, or Firm* — Jacobson Holman, PLLC.

(57) ABSTRACT

There is described a machine (1) for regeneration of pneumatic tires (2) comprising a beading device (5) for axial locking of the pneumatic tire to be regenerated in the direction of the revolving axis of the pneumatic tire (2) which provides an untranslatable bead (6) and a translatable bead (7) in said direction, a work rasp (9) mounted on a spindle (25), inflation means (66) of the pneumatic tire and a discharge cochlea (77). Said machine further comprises a roughing miller (8) suitable to prepare the pneumatic tire to a subsequent finishing by means of the rasp (9), said miller (8) being mounted on the same spindle (25) of the rasp (9) and after it, and constituted of a monoblock (27) with discharge channels (28) for chips produced by inserts (29) with a curved profile (30) providing a plurality of planar blades (31) joined by discharge grooves (32) of the chips produced.

3 Claims, 7 Drawing Sheets

MACHINE FOR REGENERATION OF PNEUMATIC TYRES

CROSS-REFERENCE TO RELATED APPLICATIONS

This is a national stage of PCT/EP10/050,601 filed Jan. 20, 2010 and published in English, which claims the priority of Italian number MI2009A000087 filed Jan. 27, 2009, hereby incorporated by reference.

BACKGROUND OF THE INVENTION

1. Field of the Invention

The present invention relates to a machine for regeneration of pneumatic tires.

2. Description of Related Art

Machines are known which include a holding devices of the pneumatic tire to be regenerated consisting of an untranslatable, revolving drive head and a translatable, revolving idle head.

The is a adapted to axially lock the pneumatic tire (in the revolving direction of the pneumatic tire) allowing the revolution thereof only. This is an important step because the correct axial positioning of the pneumatic tire has a major influence on regeneration quality.

The idle head is translated because it is integral with a movable cylinder between an opening position and a closing position in which the pneumatic tire is made integral with both heads to allow the revolving working movement only.

Said cylinder is alternatively moved either pneumatically or by means of a motorized system with mechanical transmission, and includes a positioning stop determined by mechanically actuated blocks positioned according to the predetermined holding length. This solution has the disadvantage of needing an operator to constantly check the position of the blocks, with high risks of error and measure approximation. Furthermore, the mechanical actuation causes early component wear.

Said machines further comprise a rasp both for roughing and finishing, which usually includes a plurality (e.g. 60) of pressed harmonic steel segments on an external diameter, e.g. 310 mm, of a revolving support mounted on the tool holder spindle. Said segments form a continuous, rectilinear blade parallel to the revolving axis of the spindle: the blade substantially "scrapes" the tread while remaining parallel to the revolving axis of the pneumatic tire moved by the head itself.

Said rasp is usually actuated by motors with powers in the range between 25 and 30 kW and loadless electrical input of 23 A (Amperes), with peaks of 100 A.

In general, the known machines take 4.5 minutes to regenerate one pneumatic tire.

BRIEF SUMMARY OF THE INVENTION

It is the object of the present invention to provide a fully automatic machine for regeneration of pneumatic tires, with short machining time for each pneumatic tire, and which is cost-effective from the energetic point of view.

In accordance with the invention, said first object is achieved by a machine for regeneration of pneumatic tires comprising a holding device for the axial locking of the pneumatic tire to be regenerated in the direction of the revolving axis of the pneumatic tire which provides a stationary member and a movable member in said direction, a work rasp mounted on a spindle, inflation means of the pneumatic tire and a discharge cochlea, characterized in that it comprises also a roughing miller adapted to prepare the pneumatic tire to a subsequent finishing by means of the rasp, said miller being mounted on the same spindle of said rasp and after it, and constituted of a monoblock with discharge channels for chips produced by inserts with a curved profile providing a plurality of planar blades joined by discharge grooves of the chips produced.

A further object of the present invention is to provide a tool adapted to conveniently rough the pneumatic tire.

In accordance with the present invention, said further object is achieved by a miller for roughing a tread of a pneumatic tire to be regenerated, characterized in that it is constituted of a monoblock with discharge channels for chips produced by inserts with a curved profile which provides a plurality of planar blades joined by discharge grooves for the chips produced.

A yet further object is to provide a regeneration process which optimizes the work by the means of the aforesaid machine.

In accordance with the invention said yet further object is achieved by a process for regeneration of a pneumatic tire comprising the locking of a holding device of a pneumatic tire which provides a stationary member and a movable member, characterized in that it provides the start of an oil-pressure holding circuit at a predetermined use pressure, the simultaneous opening of two lock solenoid valves to build oil pressure in chambers of an oil-pressure cylinder, the operation of a choking solenoid valve to generate a first quick displace approach movement beyond the holding length of the movable member to the stationary member on which the pneumatic tire is mounted, the inflation of the pneumatic tire, by operating again said solenoid valves a second slow displace movement in the opposite direction is generated to bring back the movable member to a distance from said stationary member equal to said holding length, and finally the two lock solenoid valves are closed again to keep said oil of chambers in pressure for an effective axial lock of the pneumatic tire necessary to a subsequent removal machining of the tread worn material by means of suitable tools.

These and other features of the present invention will be further explained in the following detailed description of a practical embodiment thereof shown by way of non-limitative example in the accompanying drawings, in which:

DETAILED DESCRIPTION OF THE INVENTION

Figure 1:
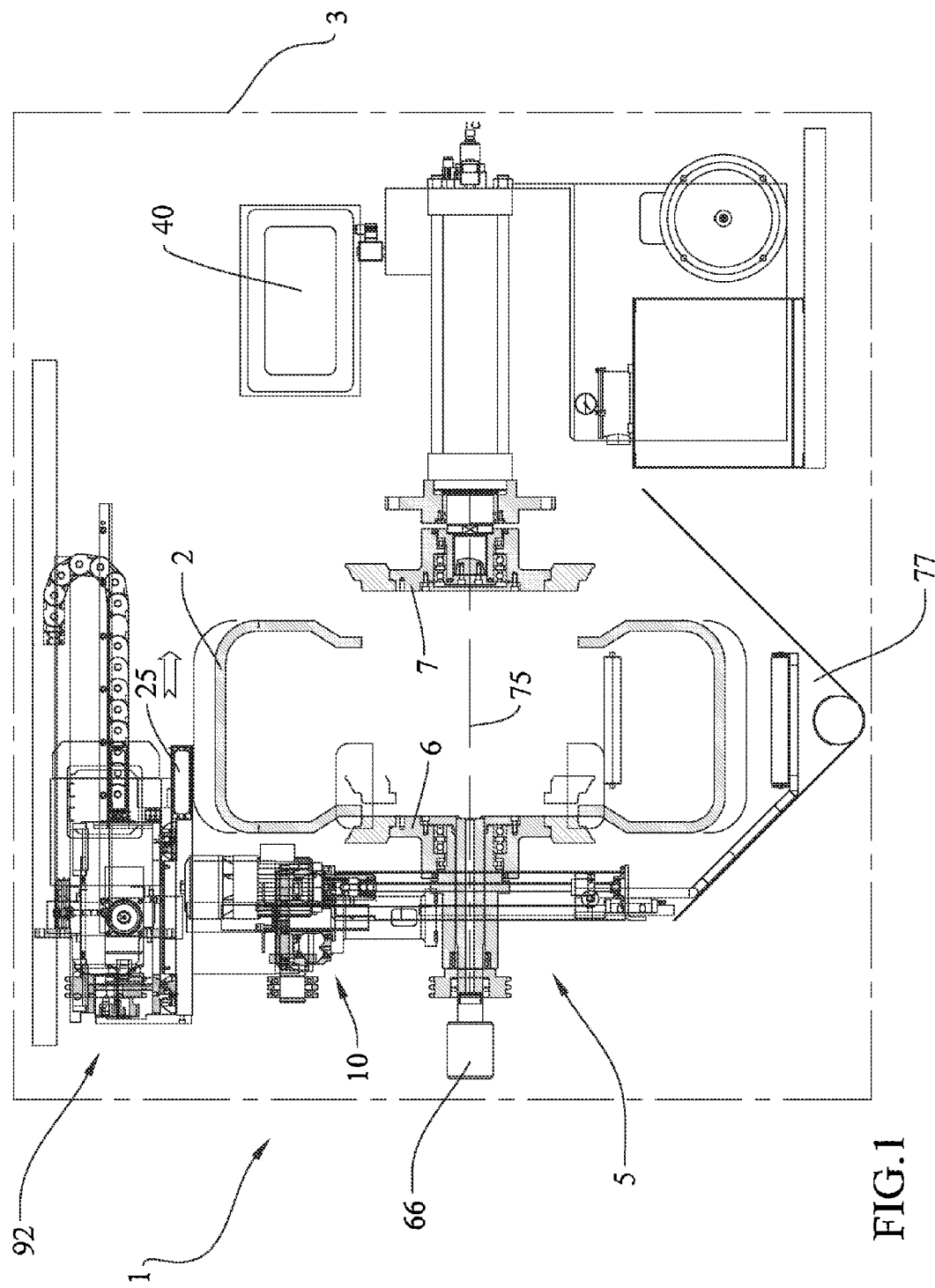
FIG. 1 shows a partial section, front view of the machine according to the present invention.

A machine 1 for regeneration of pneumatic tires 2 comprises a protective frame 3 with sliding access door 4 in which there are an oil pressure controlled holding device 5, an inflation device 66, a discharge cochlea 77 for the chips produced by a roughing miller 8 and by a finishing rasp 9.

The holding device 5 consists of a stationary member revolving in the direction of the revolving axis 75 of the pneumatic tire (or drive head 6), and by a movable member revolving in said direction (or idle head 7).

Figure 2:
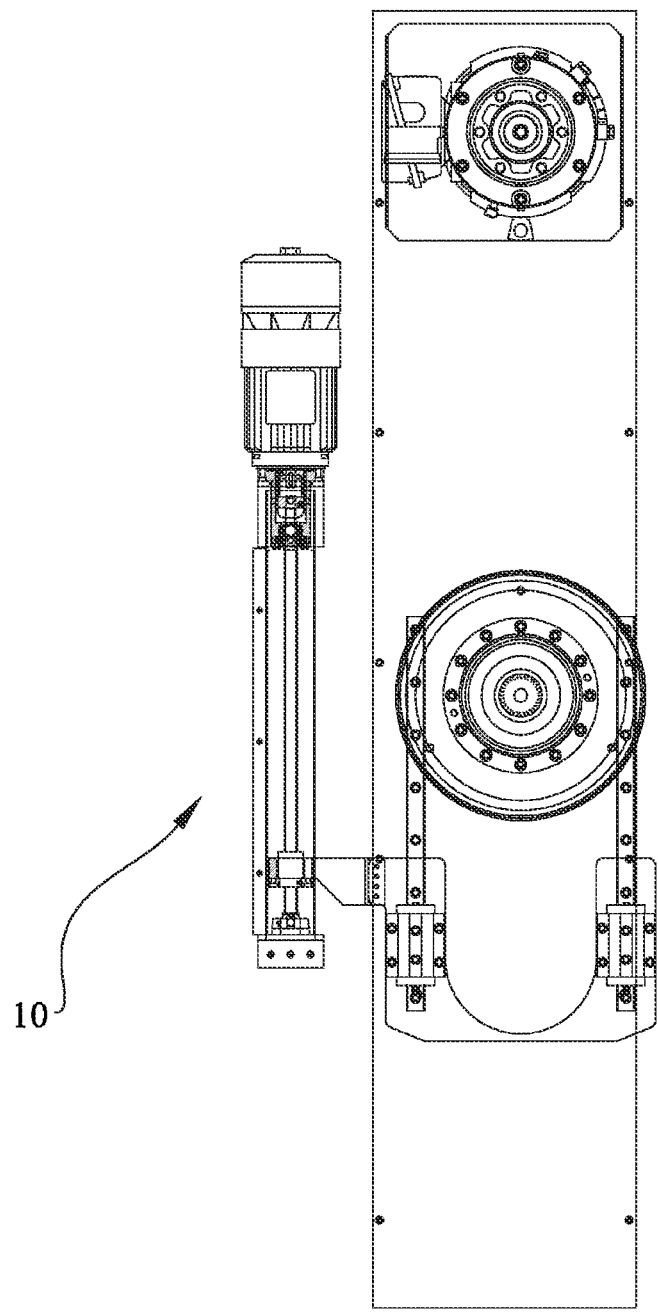
FIG. 2 shows a left side view of FIG. 1.

The drive head 6 is actuated by a chain and pinion system 10 with ratio motor (FIGS. 1 and 2).

The idle head 7 is mounted on the rod 11 (FIG. 8) of an oil pressure cylinder 12 in which two chambers 13 and 14 are identified with pressurized oil controlled by two lock solenoid valves 15, a choking solenoid valve 16 for the slow actuation of the rod 11, and two pressurizing solenoid valves 17.

Figure 8:
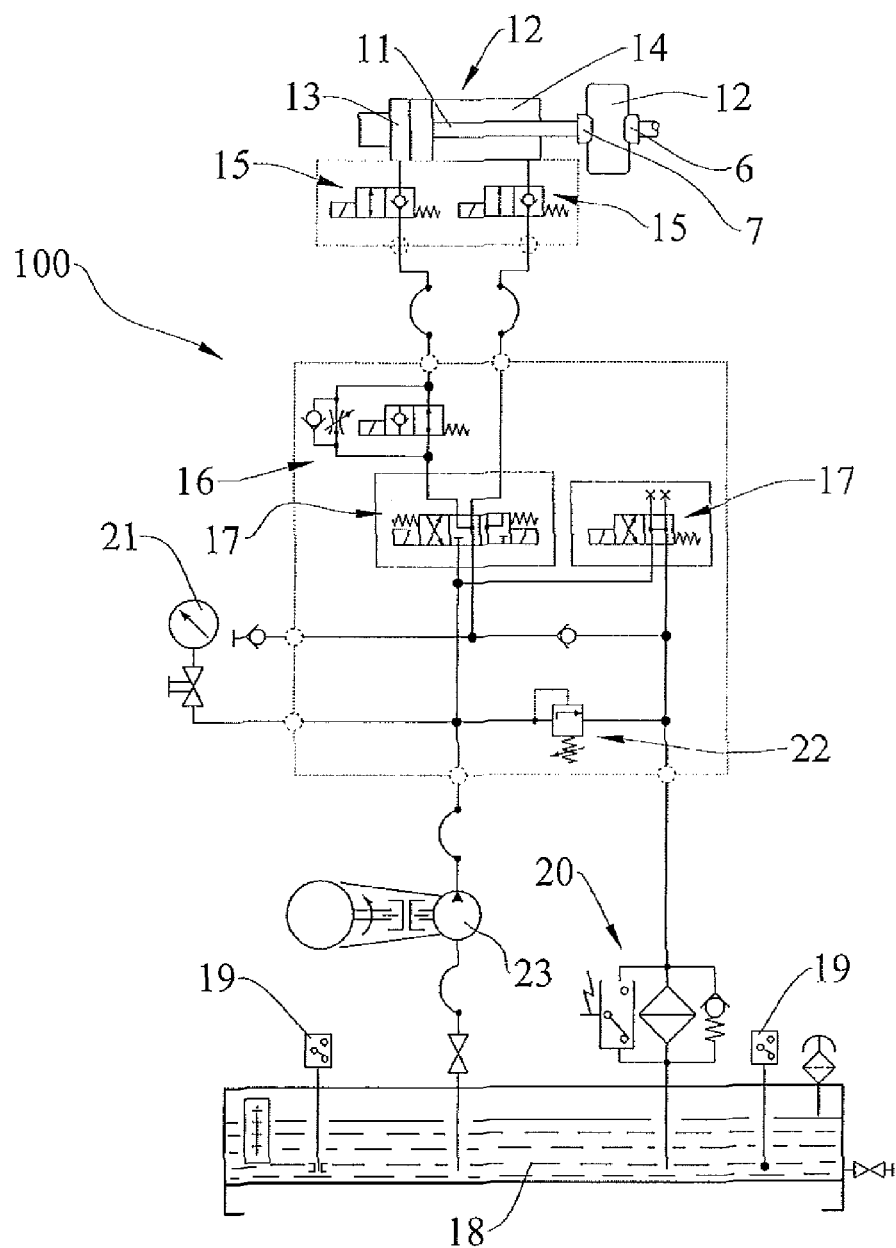
FIG. 8 shows a diagram of the hydraulic circuit for controlling the holding device.

As shown in FIG. 8, the oil pressure circuit 100 further comprises a tank 18, electric level measuring means 19, filter fouling measuring means 20, in addition to a pressure gauge 21 with maximum valve 22. A pump 23 completes the circuit 100.

Figure 3:
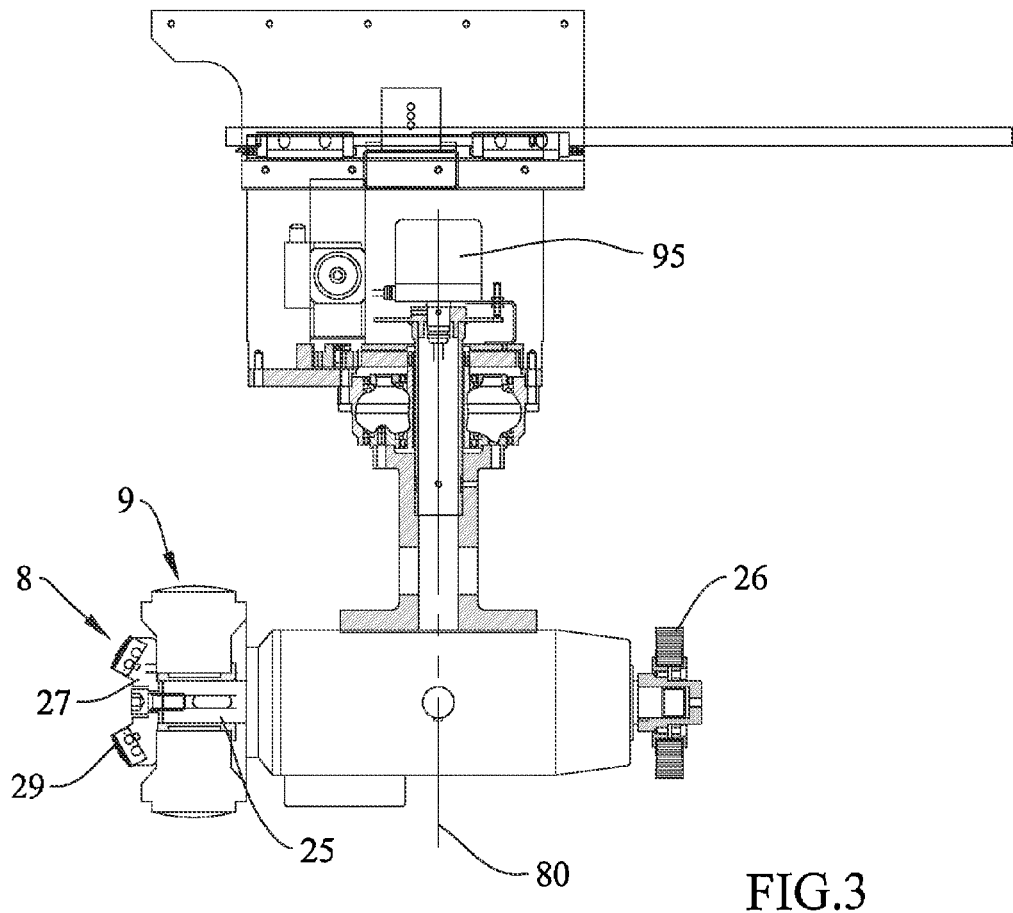
FIG. 3 shows a partial section, side view of the work tool of the pneumatic tire.

Rasp 9 and miller 8 are mounted on a same motorized spindle 25 (FIG. 3). Said spindle 25 revolves by 360.degree. about an axis 80 orthogonal to the machining revolving axis allowing a brush 26 to be mounted on the opposite side to rasp 9 and miller 8.

Miller 8 (FIGS. 4-5) consists of a monoblock 27 with discharge channels 28 for chips produced by inserts 29 made of sintered widia with variable hardness from K01 to K10 (according to ISO standards, class K concerns short chip material, such as cast iron, hardened steel and non-ferrous materials, such as for example aluminium and bronze), an insert 29 being provided for each channel 28.

Figures 9, 10:
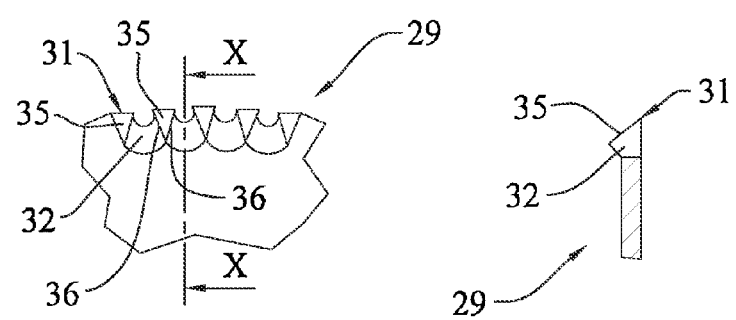
FIG. 9 shows a partial enlarged front view of the profile of the insert.
FIG. 10 shows a section view taken along line X-X in FIG. 9.
Figure 5:
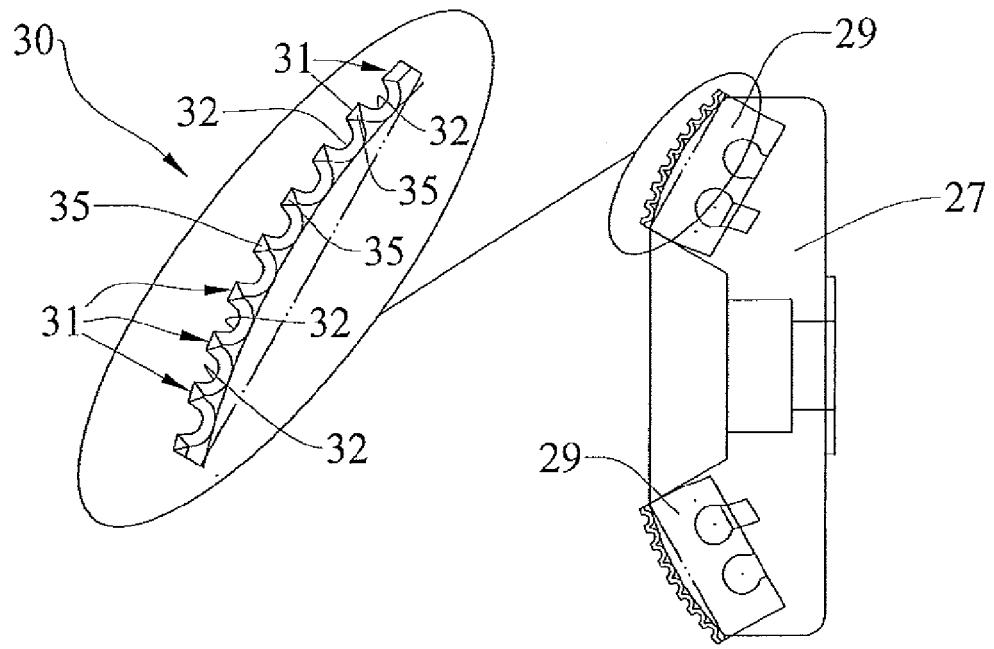
FIG. 5 shows a side view of the miller.

The detail in FIG. 5 shows the particular profile 30 of the insert 29, which includes a plurality of flat blades 31 joined by discharge grooves 32 of the chips. The further FIGS. 9 and 10 show that the blades 31 are provided with triangular cutting planes 35; the grooves 32 tend to widen downwards thus further promoting discharging; the edges 36 of the cutting planes 35 "invite" the chip to rapidly move away from the working area.

Profile 30 is curved as a whole to further improve disposal of the chips from the generally more strained central zone of insert 29.

Figure 4:
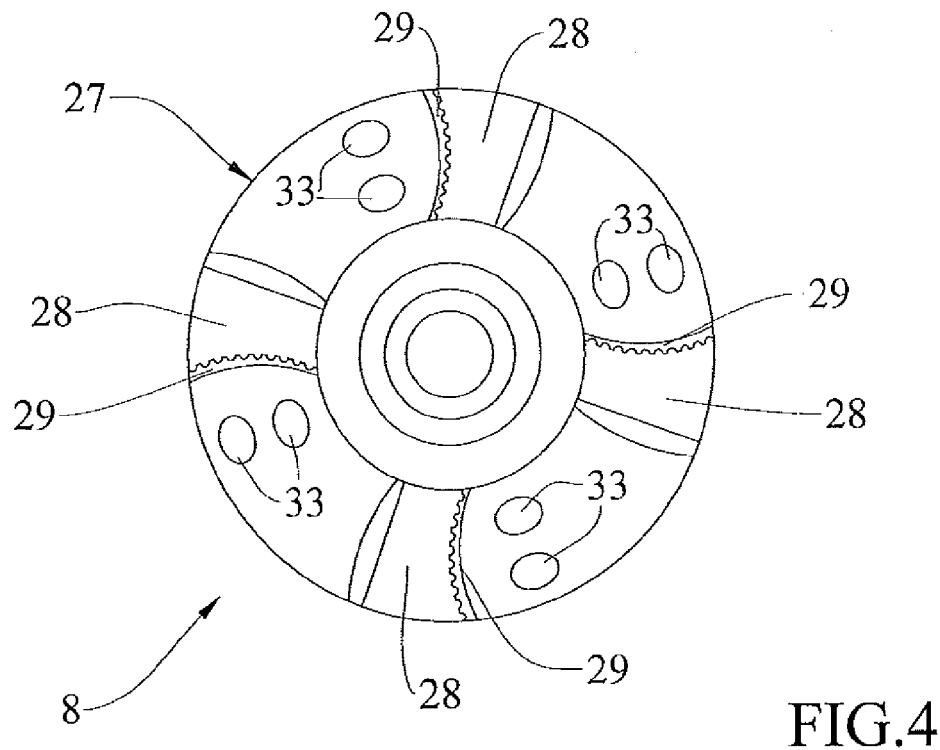
FIG. 4 shows a top plan view of the miller according to the present invention.

FIGS. 4 and 5 show that the profiles 30 of inserts 29 tend to converge towards the revolving axis of the spindle 25, and are not coplanar with a plane orthogonal to the revolving axis of the spindle. Insert 29 is contained in a geometric plane intersecting the geometric plane containing the revolving axis 85 of the spindle 25 and the plane orthogonal thereto (i.e. the one in the drawing in FIG. 4). This geometric solution allows to optimize cutting and discharging of the chip.

FIG. 4 further shows holes 33 adapted to accommodate fastening means of the inserts 29 to the monoblock 27.

Miller 8 is fixed onto the head of the spindle 25 beyond the rasp 9, with the revolving axis coinciding.

The process of regenerating the worn pneumatic tire 2 starts by manually mounting the pneumatic tire 2 on the static drive head 6 and then starting up the holding device 5 by means of a computerized control unit 40.

Once the oil pressure circuit 100 has been started, cylinder 12 is pressurized (P=55 bars), and then the two lock solenoid valves 15 are simultaneously opened, and after about 1 second the solenoid valve 16 is operated to move the rod 11 (and thus the idle head 7) to the length of pre-holding inserted into the control unit 40.

This first movement is fast (35 l/min at 55 bars): to hold at 230 mm (holding length corresponding to the width of the pneumatic tire tread), for example, the pneumatic tire will be rapidly deformed to a narrower length of 50 mm in order to be able to effectively fit the pneumatic tire on the heads 6, 7.

Once the pneumatic tire has been secured to the heads 6, 7, the pneumatic tire is pre-inflated at 1 bar of air pressure, e.g. by means of an electronic pressure switch (10 mA are needed to generate 1 bar); after 4 seconds and by means of the solenoid valves 15-17, the motion direction of rod 11 is reversed, and at slow speed (5l/min at 55 bar) the head 7 is idly taken to the holding length of 230 mm.

A first rapid approach movement of the idle head 7 to the drive head 6 beyond the predetermined length is substantially provided, and a second slow return, distancing movement for reaching the predetermined length is provided.

At the same time as the slow movement, the air pressure is taken to 1.5 bars and current is disconnected from the lock solenoid valve 15 of chamber 13 which is being discharged, thus pressurizing it at 55 bars.

Once the correct holding and inflating length has been reached (230 mm, in the example) current is also disconnected from the second lock solenoid valve 15 of chamber 14; after a few fractions of a second, the control solenoid valve 16, the pressuring solenoid valve 17, the slow speed and after about 10 seconds the oil pressure unit 40 are turned off.

A solid, stable worn pneumatic tire 2 to be machined is thus obtained (the closed lock solenoid valves 15 maintain a same pressure of 55 bars in both chambers 13 and 14), allowing to work as described below in complete safety and accuracy (a pneumatic tire inflated at 1.5 bar exerts a considerable force).

Once the pneumatic tire has been effectively centred, roughing by means of miller 8 occurs, thus removing a thickness of 5-15 mm and leaving a thickness 90 of 1 mm for finishing.

The generation is completed by finishing by means of the rasp 9 assisted by brush 26.

In the known machines, both the roughing and the finishing are carried out by a single rasp.

Roughing by means of rasp 8 according to the present invention advantageously allows a considerable saving of energy; in particular, it allows the use of a 10 kW motor 95 instead of a 25-30 kW motor for revolving the spindle 25.

Both the miller 8 and the rasp 9 are directly mounted on the spindle 25 with loadless electrical input of 2.7 A (Amperes) instead of 23 A, and input peaks of 20 A instead of 100 A while working.

Figure 6:
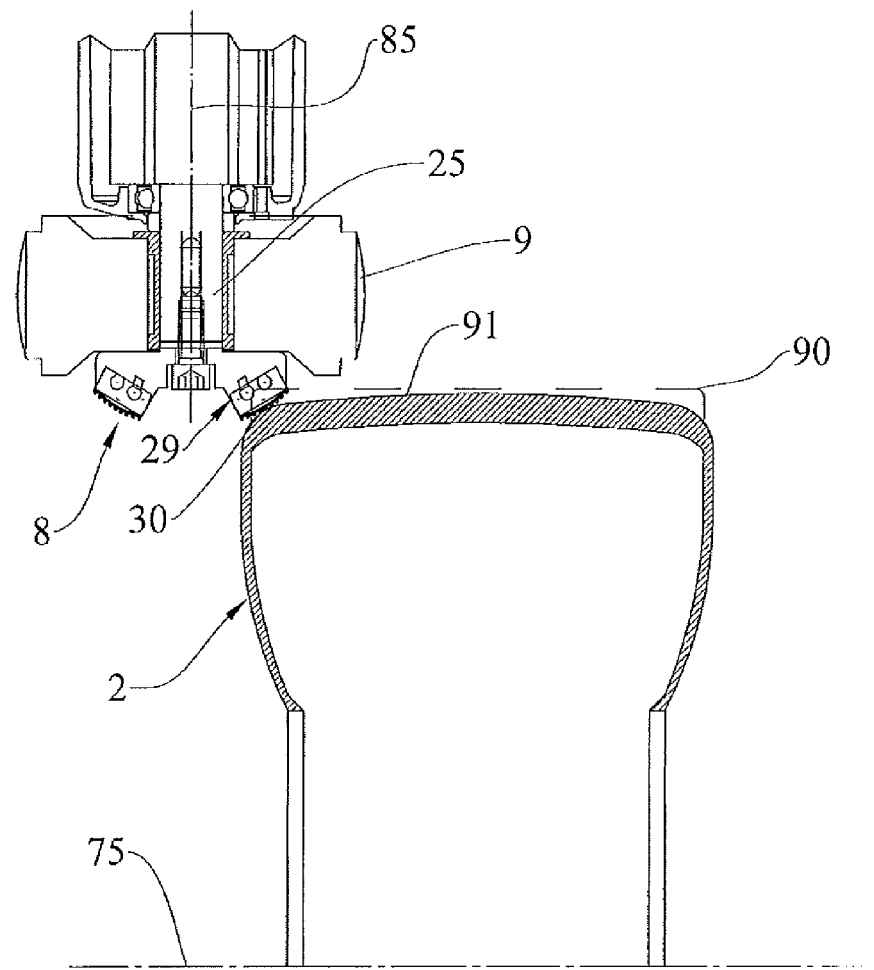
FIG. 6 shows a step of working the pneumatic tire by the miller.
Figure 7:
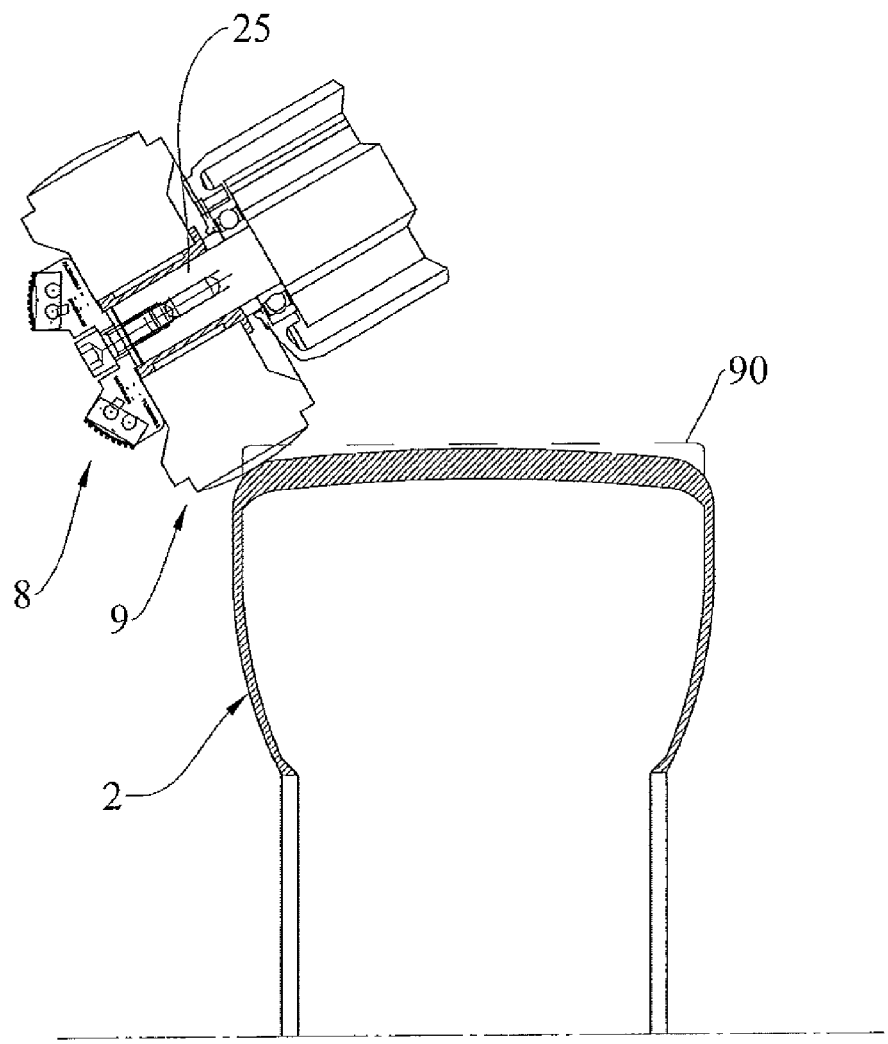
FIG. 7 shows a step of working of pneumatic tire by the rasp.

Spindle 25 has three degrees of freedom allowing to work both with the miller 8 and the rasp 9, the profile always optimally resting on the pneumatic tire, as shown in FIGS. 6 and 7. The surface 91 of the tread to be obtained is not perfectly parallel to the revolving axis of the pneumatic tire (the worn tread tends to flatten out instead), so that adjusting the orientation of spindle 25 is required, which adjustment occurs by means of a positioning mechanism 92 with three degrees of freedom and a horizontal translation travel parallel to that of the idle head 7 such as to allow to work the whole tread.

The profile 30 of miller 8 is designed for a better disposal of the chip provides by the grooves 33, thus determining a working temperature either lower than or equal to 20.degree. C.

The chip produced by the miller 8, morphologically very different from the waste material produced by a rasp, allows a more effective disposal by means of the cochlea 77 which would otherwise get frequently obstructed: in order to obviate this problem, the user often eliminates the protective frame 4, thus compromising the safety of the machine.

A lower temperature advantageously implies less vibrations and less noise and therefore allows to work at higher revolving speeds of the spindle (over 3000 rpm).

The machine according to the present invention works faster than the known machines, regenerating a pneumatic tire in 3.5 minutes instead of 4.5 minutes.

Furthermore, the quality of the regenerated pneumatic tire is high by virtue of the accuracy of the oil pressure-type holding device 5: the pneumatic tire to be worked is perfectly centred.

Oil should be used for controlling the circuit because its incompressibility is exploited; otherwise it would be difficult (impossible) to control the position of rod 11 with absolute accuracy (tolerances 0.05 mm).

The above-described miller 8 may be used regardless of the aforesaid machine, while preserving the advantages deriving from its use.

The invention claimed is:

1. A machine for regeneration of pneumatic tires comprising a holding device for axial locking of the pneumatic tire to be regenerated in the direction of a revolving axis of the pneumatic tire which provides an stationary member and a movable member in said direction, a work rasp mounted on a spindle, inflation means of the pneumatic tire and a discharge cochlea, characterized in that the machine further comprises a roughing miller suitable to prepare the pneumatic tire to a subsequent finishing by means of the rasp, said miller being mounted on the same spindle of said rasp and after it, and constituted of a monoblock with discharge channels for chips produced by inserts with a curved profile providing a plurality of planar blades joined by discharge grooves of the chips produced, wherein the movable member is integral with a rod partially internal to an oil-pressure cylinder controlled by an oil-pressure circuit, and wherein said oil-pressure circuit comprises a couple of lock solenoid valves for the oil flux from and towards respective chambers defined internally of the cylinder by a displaceable head integral with the rod, a choking solenoid valve for the oil flux for the adjustment of the displacement direction and speed of the rod, at least one pressurizing solenoid valve, a pump, a tank, and measuring and safety means.

2. The machine according to claim 1, characterized in that the blades are provided with triangular cutting planes joined by grooves which tend to widen towards the bottom.

3. The machine according to claim 1, characterized in that said spindle supporting said miller and said rasp is driven by a 10 kW motor with a loadless electrical input of 2.7 ampere, with electrical peak input of 20 ampere.

* * * * *